No. 786,092. PATENTED MAR. 28, 1905.
W. G. BOLUS.
BOILER FLUE SCRAPER.
APPLICATION FILED AUG. 8, 1903.
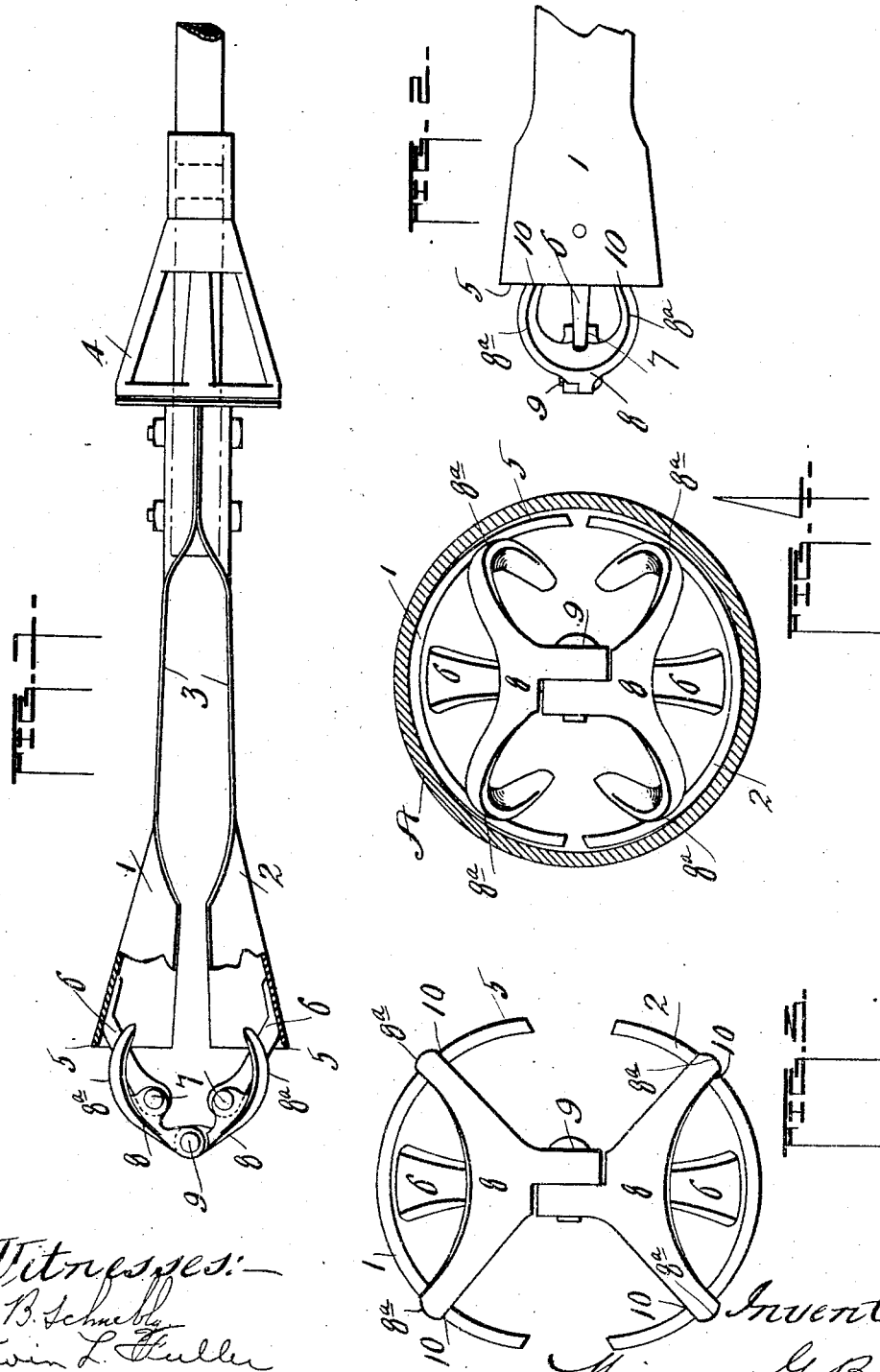

No. 786,092.                                                          Patented March 28, 1905.

UNITED STATES PATENT OFFICE.

WILLIAM G. BOLUS, OF PEORIA, ILLINOIS, ASSIGNOR TO AREMAC MANUFACTURING COMPANY, OF PEORIA, ILLINOIS, A CORPORATION OF ILLINOIS.

BOILER-FLUE SCRAPER.

SPECIFICATION forming part of Letters Patent No. 786,092, dated March 28, 1905.

Application filed August 8, 1903. Serial No. 168,730.

*To all whom it may concern:*

Be it known that I, WILLIAM G. BOLUS, a citizen of the United States, residing at Peoria, in the county of Peoria and State of Illinois, have invented certain new and useful Improvements in Boiler-Flue Scrapers; and I do hereby declare that the following is a full, clear, and exact description of the invention, which will enable others skilled in the art to which it appertains to make and use the same.

This invention has reference to boiler-flue scrapers, and has for its object to provide means attached to and extending in advance of the scraping devices, so that as the scraper enters the mouth of the flue the scraping devices will be contracted, and thus facilitate the entrance of the scraper into the flues.

The improvement is especially adapted to that type of scrapers shown in Patent No. 415,282, dated November 19, 1899, using yielding scraping-blades.

To enable others skilled in the art to understand and use my invention, I will preceed to describe the manner in which I have carried it out.

In the drawings, Figure 1 is a plan of a scraper, showing my improvement attached to its scraping devices. Fig. 2 is a side elevation showing only the forward portion of the scraper. Fig. 3 is an enlarged end view of the scraping devices expanded and my improvement attached. Fig. 4 is an enlarged end view of the scraping devices contracted within a tube or flue.

1 2 indicate two scraping-blades formed somewhat as curved sheet-metal blades, extended rearwardly into longitudinal shanks 3, by which they are attached to a suitable head 4. The scrapers, with their immediate extensions, are preferably formed of steel, with sharp cutting edges 5 at the front. Where two blades are used, as is usually the case, they are attached to the head 4 at opposite sides, standing somewhat apart divergently as they project forward concentrically to a larger diameter than the flue and are to be closed somewhat together against the yielding elasticity of their shank extensions when inserted into the mouth of the flue. The outward "spring" of the shank extensions causes the outer cutting edges to bear against the inner peripheries of the flue (indicated as A) at a slight angle, but in the general longitudinal direction of the flue. The arrangement and operation of these scrapers are too well known to require further description, and the several forms of scraping-blades are also too well known to require further illustration, and so the form selected is deemed sufficient to illustrate in a practical way the application of my improvement.

To the forward ends of the blades 1 and 2 and to their inner concave faces are riveted or otherwise suitably secured the arms 6, which extend forwardly of the blades and inward, as seen in the figures, in such a manner as to leave the cutting edges of the blades directly without the same free to act upon the surface of a flue. The outer ends of the arms are pivotally attached at 7 to two oscillatory arms 8 8, which are pivoted together at 9, the said arms consisting of a member having the bifurcated finger portions $8^b$ bowed backward and inwardly, and where the bifurcations unite to form into a center-piece there the pivot 7 is provided, and the rear ends of the fingers enter between the blades, normally bearing against the edges of the blades, as at 10, and when the blades are expanded their full width the bowed portions $8^a$ of the blades extend slightly beyond the circumferential cutting edge of the blades.

When forcing the cleaner into a tube or flue, the bowed portions of the arms 8 engage first with the tube and by such contact are contracted, drawing together the blades 1 and 2 through their connection with the arms 6, which will place the blades and arms 8 substantially in the position shown in Fig. 4, permitting the blades to have use of their entire cutting edges. When withdrawn from the tube, they readily reassume the position seen in Figs. 1 and 3, owing to the spring in the blades.

Modifications may be made and details resorted to without departing from the principle and scope of invention herein, and I do not wish to be confined to the details set forth.

Having thus fully described my invention, what I claim, and desire to secure by Letters Patent of the United States, is—

1. In a scraper, the combination of a pair of scraping-blades, an arm connected to the inner faces of each of the blades and extending forwardly thereof, and a pair of oscillating members connected with said arms and having a pivotal connection with each other, adapted when entering a tube to contract the blades.

2. In a scraper, the combination of a pair of scraper-blades having cutting edges, arms having a fixed connection with said blades, bowed members pivoted to each other in advance of the ends of the arms, and having the ends of the arms pivoted to the bodies of said members, substantially as specified.

3. In a scraper, the combination of spring scraping-blades having cutting edges, arms attached to the inner faces of the blades and extending forward and inward therefrom, members pivoted to each other and to the said arms, and said members provided with bowed portions adapted to engage with the wall of a tube when entering the same to contract the blades, in manner and for the purposes set forth.

4. In a scraper, the combination with scraping-blades, two oscillatory members having a common pivot in advance of the blades, arms from the blades converging toward the pivot of the members and pivoted to said members at a point between their common pivot and the edges of the blades.

5. In a scraper, the combination with scraping-blades, arms extending forwardly of the blades having their outer ends attached to the blades, and members connected with said arms and pivoted to each other, the said members having a pair of fingers normally engaging the cutting edge of the blades, adapted when engaging a tube to contract the blades, in manner and for the purposes set forth.

In testimony whereof I affix my signature in presence of two witnesses.

WILLIAM G. BOLUS.

Witnesses:
   CHAS. W. LA PORTE,
   ROBT. N. McCORMICK.